(12) United States Patent
Wu et al.

(10) Patent No.: US 6,480,400 B2
(45) Date of Patent: Nov. 12, 2002

(54) POWER SUPPLY APPARATUS

(75) Inventors: Tsung Hsun Wu, Taoyuan (TW); Chuan Chu Chen, Taoyuan (TW)

(73) Assignee: Acer Communications and Multimedia Inc., Taoyuan (TW)

( * ) Notice: Subject to any disclaimer, the term of this patent is extended or adjusted under 35 U.S.C. 154(b) by 0 days.

(21) Appl. No.: 09/848,565

(22) Filed: May 3, 2001

(65) Prior Publication Data

US 2002/0024825 A1 Feb. 28, 2002

(30) Foreign Application Priority Data

Aug. 29, 2000 (TW) .................................. 89117463 A

(51) Int. Cl.$^7$ ............................................. H02M 3/335
(52) U.S. Cl. ................................................. 363/21.01
(58) Field of Search ........................ 363/16, 20, 21.01, 363/21.12, 95, 97, 131

(56) References Cited

U.S. PATENT DOCUMENTS 5,408,401 A * 4/1995 Miyazaki .................... 363/21
5,581,453 A * 12/1996 Ueta et al. ................... 363/49
5,684,679 A * 11/1997 Hong .......................... 363/21
5,880,942 A * 3/1999 Leu ............................. 363/49

FOREIGN PATENT DOCUMENTS

| TW | 328992 | 4/1998 |
| TW | 329949 | 4/1998 |

* cited by examiner

Primary Examiner—Matthew Nguyen
(74) Attorney, Agent, or Firm—Ladas & Parry

(57) ABSTRACT

The present invention provides a power supply apparatus for outputting an output voltage according to a first signal from outside, the power supply apparatuses comprises a rectifier, a power transformer, a power control circuit, and a switching device. The rectifier is provided for supplying a DC voltage source. The power transformer receives the DC voltage source, then outputs the output voltage and a second signal. The power control circuit is provided for controlling the output voltage of the power transformer according to the second signal, then the switching device outputs the second signal to the power control circuit according to the first signal.

30 Claims, 3 Drawing Sheets

POWER SUPPLY APPARATUS

BACKGROUND OF THE INVENTION

1. Field of the Invention

The present invention relates in general to a power supply apparatus for computers, monitors, and other computer peripheral devices. In particular, the present invention relates to a power supply apparatus for starting a monitor according to the power signal supplied from the computer host. When the computer is in the Display Power Management Signaling mode, as DPMS hereinafter, the power supply apparatus is disabled to turn off the monitor and stops supplying the power source to the elements in the power supply apparatus for economizing on the power in the computer system.

2. Description of the Related Art

Recently, switching type power supply apparatuses have been used in computers and computer peripheral devices. In general, a pulse-width modulation controller (PWM controller) is utilized as a power supply control circuit for a switching type power supply. The PWM controllers such as the 3842 IC and 3844 IC series require sufficient voltage and current to start their control functions normally, so a starting circuit is necessary. However, once the PWM controller has started, the energy for activating the PWM controller is supplied by an auxiliary power source. Therefore, the starting circuit becomes a redundant circuit and continuously consumes power.

FIG. 1 shows a circuit diagram of a conventional switching type power supply apparatus, and a stabilizing control circuit for stabilizing the output voltage is omitted.

As shown in FIG. 1, a rectifier 1, such as a full-bridge rectifier, rectifies an alternating-current (AC) voltage into a direct current (DC) voltage, and a filter capacitor 2 filters the rectified voltage and reduces the voltage ripple. The rectified and filtered voltage charges a starting capacitor 4 through a starting resistor 3 and thus the starting resistor 3 supplies the rectified and filtered voltage to a power supply control circuit 5 (here, the power supply control circuit is a 3842 controller, for example). After activating the power supply control circuit 5, the power supply control circuit 5 issues a switching signal to a control transistor 6, such as a NMOS transistor. The gate of the NMOS transistor 6 is connected to the power supply control circuit 5.

A power transformer 7 has a primary winding 7a, a secondary winding 7b and a tertiary winding 7c. The primary winding 7a of the power transformer 7 is connected to the drain of the NMOS transistor 6, thereby supplying a rectified and filtered voltage. By switching the NMOS transistor 6, a pulse voltage is generated in the secondary winding 7b and the tertiary winding 7c. The pulse voltage generated in the tertiary winding 7c is rectified and filtered by an auxiliary diode 8 and the starting capacitor 4, and its output voltage is supplied to both ends of the power supply control circuit. The pulse voltage generated in the secondary winding 7b is rectified and filtered by an output diode 9 and an output capacitor 10, thereby producing an output voltage.

The operation of the power supply apparatuses as shown in FIG. 1 is described as follows. When an AC voltage is supplied to the power supply apparatuses, the AC voltage is rectified and filtered into a DC voltage by the rectifier 1 and the filter capacitor 2. The DC voltage charges the starting capacitor 4 through the starting resistor. As the voltage rises at point A, the voltage at point B also rises and is supplied to the power supply control circuit 5. When the voltage at point B exceeds a specific voltage level, the power supply control circuit 5 is activated. For example, if the power supply control circuit 5 is a 3842 controller then the voltage at point B must at least equal 16 V to activate the 3842 controller. The power supply control circuit 5 issues a switching signal to switch (turn on and off) the control transistor 6. Then, pulse voltages are generated in the secondary winding 7b and tertiary winding 7c. The pulse voltage generated in the secondary winding 7b is rectified and filtered by an output diode 9 and an output capacitor 10, and thus a DC voltage is supplied to the other device (not shown). The pulse voltage generated in the tertiary winding 7c is rectified and filtered by a auxiliary diode 8 and the starting capacitor 4, and its output voltage is supplied to both ends of the power supply control circuit 5. That is, the power source of the power supply control circuit 5 is supplied through the starting resistor 3 at the outset when AC voltage is applied to the power supply apparatuses. After activating the power supply control circuit, the working voltage for the power supply control circuit is supplied through the tertiary winding 7c of the power transformer 7. However, a current also flows through the starting resistor 3, and electrical power is consumed.

Generally, the input AC voltage specifications of computers and computer peripheral devices are somewhere between 90 V and 264 V. The power loss consumed by the starting resistor can be calculated as follows. Suppose 90 V AC is supplied to the power supply apparatuses, after being rectified and filtered, the DC voltage is about 90 V×1.414= 127.6 V. A 3842 controller is used as a power supply control circuit 5, and the minimal starting current for the 3842 controller is about 1 mA. Therefore, the maximal resistance of the starting resistor can be (127.26 V—16 V)2 /1 mA)= 111.26 K.OMEGA. When the AC voltage equals 264 V, the voltage at point A after being rectified and filtered is about 373.296 V (264 V×1.414). After the 3842 controller is activated, the voltage at point B drops to about 10 V. Consequently, the power consumption of the starting resistor 3 is about (373.296 V—10 V)2 /111.26 K.OMEGA.=1.18 W.

In computers and computer peripheral devices, a power-saving function for decreasing the power consumption of these devices when not in the energized state is desired. The power-saving function should decrease the power consumption less than 3 W, and the power loss (1.18 W) in the starting resistor 3 cannot be ignored.

The general power supply circuit can reduce the power dissipation by the starting resistor, however, it still suffers from some problems, while operating with a power-saving IC in a power-saving mode.

In power-saving mode, the power-saving IC will take control of the power supply. The power-saving IC shuts down the unnecessary power output, for example the power output for the horizontal and vertical scanning signals of a monitor, except for a power output with +5 V and 10 mA for the power-saving IC.

To meet the above requirements, one way is to keep the current flows through the starting resistor 3 and the power supply keep operating to allow the power-saving IC to function. In this way, the circuit has a faster power response. However, this increases the circuitry complexity and cost and the power consumption cannot be controlled to satisfy the power requirements.

SUMMARY OF THE INVENTION

The object of the present invention is to provide a power supply apparatus, which operates according to the power source signal of a computer host in the normal mode. When the host is in the DPMS mode, the power supply to the monitor is shut down because the host doesn't output the power source signal. Therefore, the consumption of the monitor will decrease in DPMS mode with reduced circuitry complexity and cost.

To achieve the above-mentioned object, the present invention provides a power supply apparatus for outputting an output voltage according to a first signal from outside, the power supply apparatuses comprise a rectifier, a power transformer, a power control circuit, and a switching device. The rectifier is provided for supplying a DC voltage source. The power transformer receives the DC voltage source, then outputs the output voltage and a second signal. The power control circuit is provided for controlling the output voltage of the power transformer according to the second signal, then the switching device outputs the second signal to the power control circuit according to the first signal.

Moreover, the present invention further comprises a host and a monitor. The host is provided for supplying a first signal, and the monitor comprises a power supply apparatus for supplying an output voltage to the monitor according to the first signal. Wherein the power supply apparatus comprises a rectifier, a power transformer, a power control circuit, and a switching device. The rectifier is provided for supplying a DC voltage source. The power transformer receives the DC voltage source, then outputs the output voltage and a second signal. The power control circuit is provided for controlling the output voltage of the power transformer according to the second signal, then the switching device outputs the second signal to the power control circuit according to the first signal.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENT

Figure 1:
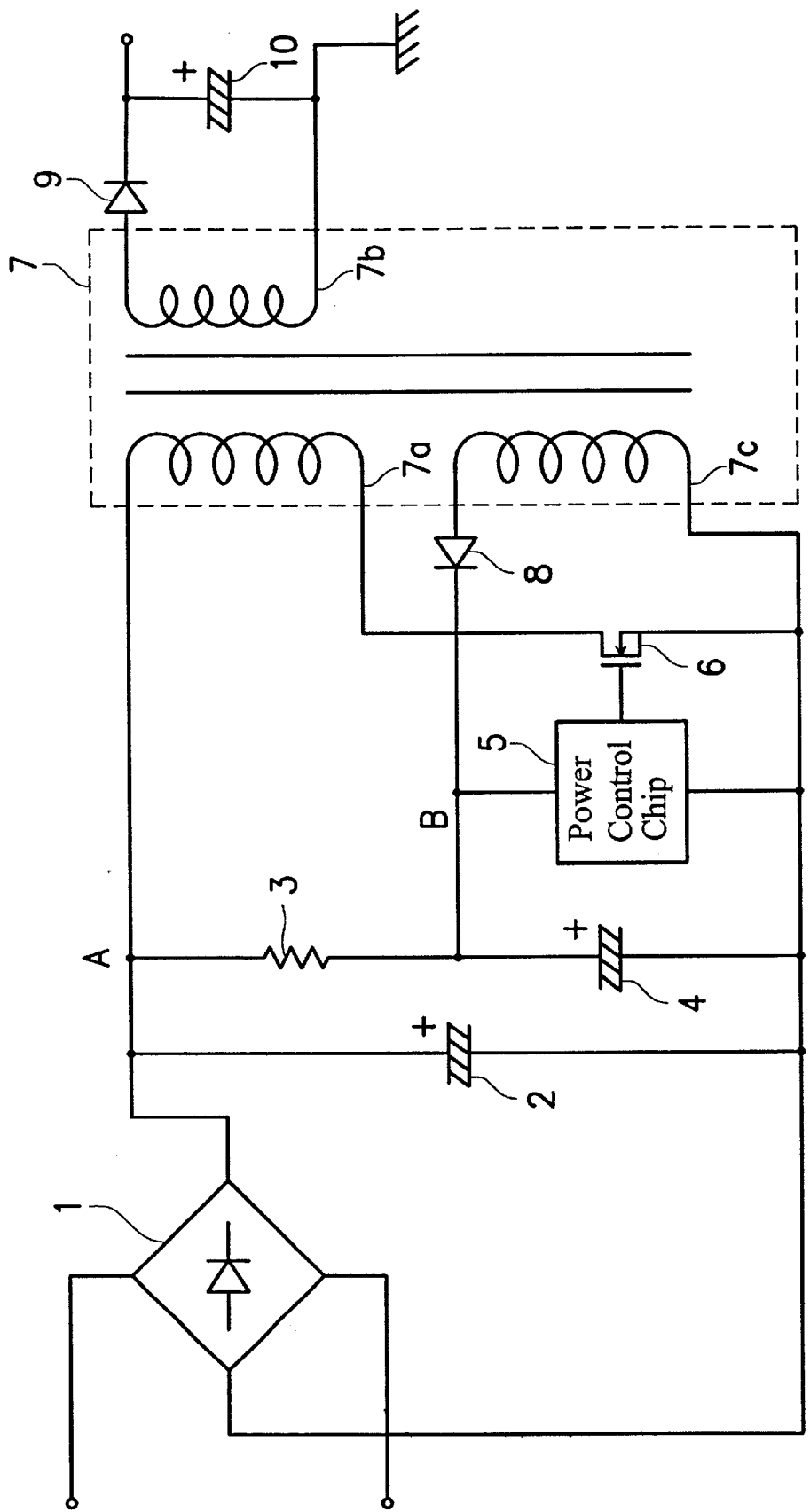
FIG. 1 illustrates a circuit diagram of a conventional power supply apparatus.
Figure 2:
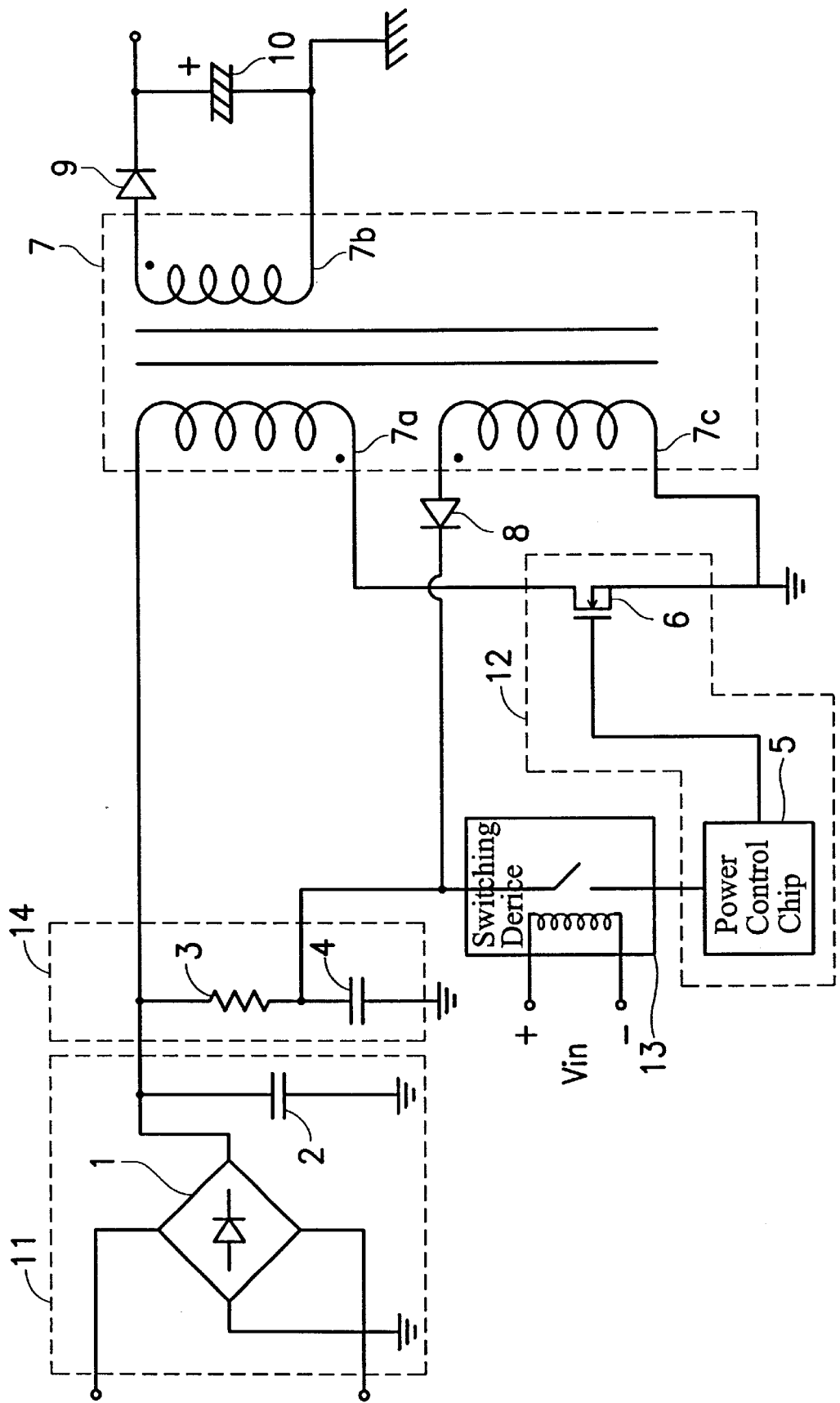
FIG. 2 illustrates a circuit diagram of a power supply apparatus according to the embodiment of the present invention.

FIG. 2 illustrates a circuit diagram of a power supply apparatus according to the embodiment of the present invention. For simplicity, a stabilizing control circuit for stabilizing the output voltage is omitted. Parts similar to those identified with regard to the prior art or conventional art are identified with the same reference numerals and their explanations are omitted.

Figure 3:
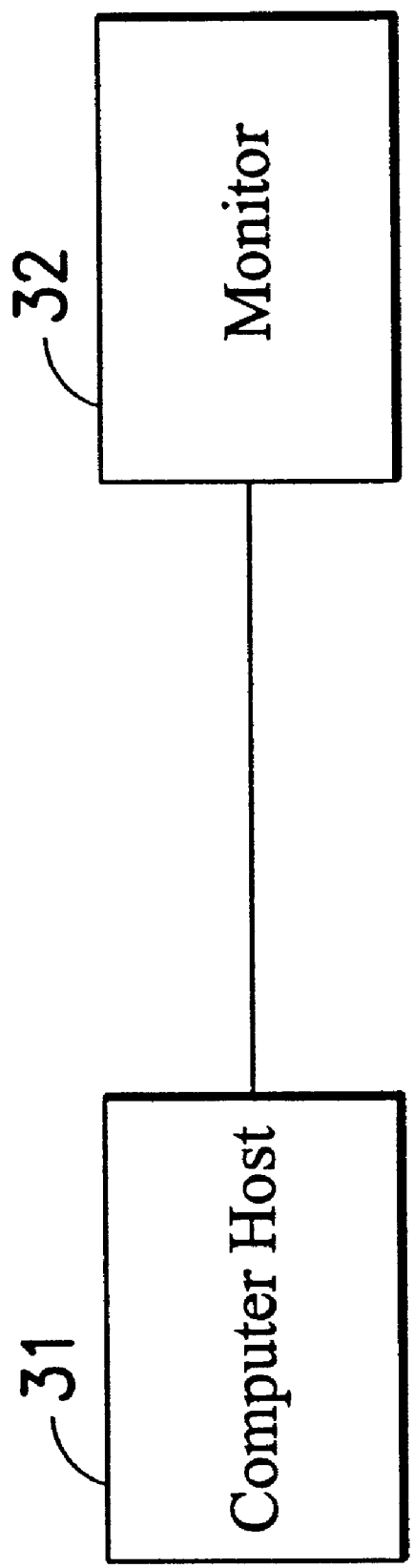
FIG. 3 illustrates a block diagram of a computer host and a monitor according to the embodiment of the present invention.

As depicted in FIG. 2, a rectifier device 11 which comprises a bridge rectifier 1 and a capacitor 2 is provided to rectify the alternating current (AC) voltage from outside into a direct current (DC) voltage. The power transformer 7 comprises a primary winding 7a, a secondary winding 7b, and a tertiary winding 7c. The power control circuit 12 comprises a power control chip 5 and a control transistor 6. For example, the control transistor 6 is an NMOS transistor, and the power control chip 5 is selected from the control IC of the 3842 and 3844 series. The power source outputs a switching signal to switch on and off the control transistor 6, therefore, the amount of current passing trough the primary winding 7a of the power transformer 7 is changed, and the secondary winding 7b and the tertiary winding 7c will generate the induced voltage, respectively. A switching device is provided for detecting the power source signal Vin from the computer host (not shown). In this embodiment, the switching device is a relay. In FIG. 3, the power source Vin is transmitted from the computer host 31 to the power supply of the monitor 32 through a serial transmission line. The switching device 13 turns on to provide the power generated in the tertiary winding 7c to the power control circuit when the switching device detects the power source signal Vin. Moreover, in this embodiment, the switching device is turned on and off periodically according to the power source signal Vin of the host 31. However, the on-off state of the switching device may be responding to any other signals of the host 31. There is a protection diode 8 provided between the tertiary winding 7c and the switching device 13. The anode of the diode 8 is connected to the tertiary winding 7c of the power transformer 7, and the cathode of the diode 8 is connected to the switching device 13. Moreover, there is a starting circuit 14 located between the power transformer 7 and the switching device 13, which is composed of a plurality of resistors and capacitors.

The operation of the power supply apparatus mentioned above is described as follows. It is supposed that the computer host 31 operates in the normal mode, so the host 31 supplies a power source signal Vin to the monitor 32 to turn on the switching device 13. When the AC voltage is supplied to the power supply of the monitor 32, the AC voltage is transformed to the DC voltage through the rectifier 1 and the filter capacitor 2. Then the DC voltage is supplied to the power control chip 5 through the starting circuit 14. Therefore, the power control chip 5 is enabled, then the power control chip 5 issues the periodical switching signal to continuously switch (turn on and off) the control transistor 6. Then, pulse voltages are generated in the secondary winding 7b and tertiary winding 7c. The pulse voltage generated in the secondary winding 7b is rectified and filtered by an output diode 9 and an output capacitor 10, whereby a DC output voltage is supplied to the other circuit device (not shown).

When the computer host 31 operates in the DPMS mode, the power source signal Vin of the host 31 is shut off. So the switching device 13 is turned off to disable the power control chip 5. Moreover, because of the inactivity of the power control chip 5, the control transistor 6 stops the operation of switching. Finally, the power transformer cannot output the induction voltage because the magnetic flux in the primary winding 7a is not changed. Furthermore, the outside AC voltage cannot provide power to the supply apparatus because there is not any current paths between the power supply apparatus and the AC power supply. So the power will not be consumed any more.

According to the circuit structure of the embodiment, when the host operates in the DPMS mode, the power supply is disabled, and the elements in the power supply will not consume the power, which solve the shortcoming of the conventional circuit structure.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A power supply apparatus for outputting an output voltage according to a first signal from outside, comprising:
   a rectifier for supplying a DC voltage source;
   a power transformer which receives the DC voltage source, then outputs the output voltage and a second signal;
   a power control circuit for controlling the output voltage of the power transformer according to the second signal; and
   a switching device for outputting the second signal to the power control circuit according to the first signal.

2. The power supply apparatus as claimed in claim 1, wherein the first signal is a power source signal.

3. The power supply apparatus as claimed in claim 2, wherein the power control circuit further comprises:
   a power control chip which is coupled to the switching device; and
   a control transistor which is coupled between the power control chip and the power transformer, wherein the control transistor switches on and off according to a switching signal of the power control chip to control the output voltage of the power transformer.

4. The power supply apparatus as claimed in claim 3, wherein the control transistor is an NMOS transformer.

5. The power supply apparatus as claimed in claim 3, wherein the power control chip is selected from the control IC of the 3842 and 3844 series.

6. The power supply apparatus as claimed in claim 3, wherein the power transformer comprising a primary winding, a secondary winding, and a tertiary winding, and the DC voltage source is applied to the primary winding and the control transistor, then the secondary and tertiary winding produces the output voltage and the second signal according to the switch on-off operation of the control transistor, respectively.

7. The power supply apparatus as claimed in claim 6, further comprising a protecting diode disposed between the tertiary winding of the power transformer and the switching device.

8. The power supply apparatus as claimed in claim 7, wherein the rectifier comprises a bridge rectifier and a capacitor.

9. The power supply apparatus as claimed in claim 8, wherein the switching device is a relay.

10. The power supply apparatus as claimed in claim 7, further comprising a starting circuit which is composed of resistors receiving the DC voltage source and capacitors charged by the DC voltage source.

11. A computer device, comprising:
   a host for supplying a first signal; and
   a monitor, which comprises a power supply apparatus for supplying an output voltage to the monitor according to the f first signal, wherein the power supply apparatus comprises:
      a rectifier for supplying a DC voltage source;
      a power transformer which receives the DC voltage source, then outputs the output voltage and a second signal;
      a power control circuit for controlling the output voltage of the power transformer according to the second signal; and
      a switching device for outputting the second signal to the power control circuit according to the first signal.

12. The power supply apparatus as claimed in claim 11, wherein the first signal is a power source signal.

13. The power supply apparatus as claimed in claim 12, wherein the power control circuit further comprises:
   a power control chip which is coupled to the switching device; and
   a control transistor which is coupled between the power control chip and the power transformer, wherein the control transistor switches on and off according to a switch signal of the power control chip to control the output voltage of the power transformer.

14. The power supply apparatus as claimed in claim 13, wherein the control transistor is an NMOS transformer.

15. The power supply apparatus as claimed in claim 13, wherein the power control chip is selected from the control IC of the 3842 and 3844 series.

16. The power supply apparatus as claimed in claim 13, wherein the power transformer comprises a primary winding, a secondary winding, and a tertiary winding, wherein the DC voltage source is applied to the primary winding and the control transistor, then the secondary and tertiary winding produces the output voltage and the second signal according to the switch on-off operation of the control transistor, respectively.

17. The power supply apparatus as claimed in claim 16, further comprising a protecting diode disposed between the tertiary winding of the power transformer and the switching device.

18. The power supply apparatus as claimed in claim 17, wherein the rectifier comprises a bridge rectifier and a capacitor.

19. The power supply apparatus as claimed in claim 16, wherein the switching device is a relay.

20. The power supply apparatus as claimed in claim 16, further comprising a starting circuit which is composed of resistors receiving the DC voltage source and capacitors charged by the DC voltage source.

21. A monitor device for coupling a host which supplies a first signal, comprising:
   a power supply apparatus which outputs an output voltage to a monitor device according to the first signal, wherein the power supply apparatus comprises:
      a rectifier for supplying a DC voltage source;
      a power transformer which receives the DC voltage source, then outputs the output voltage and a second signal;
      a power control circuit for controlling the output voltage of the power transformer according to the second signal; and
      a switching device for outputting the second signal to the power control circuit according to the first signal.

22. The power supply apparatus as claimed in claim 21, wherein the first signal is a power source signal.

23. The power supply apparatus as claimed in claim 22, wherein the power control circuit further comprises:
   a power control chip which is coupled to the switching device; and
   a control transistor which is coupled between the power control chip and the power transformer, wherein the control transistor switches on and off according to a switching signal of the power control chip to control the output voltage of the power transformer.

24. The power supply apparatus as claimed in claim 23, wherein the control transistor is an NMOS transformer.

25. The power supply apparatus as claimed in claim 23, wherein the power control chip is selected from the control IC of the 3842 and 3844 series.

26. The power supply apparatus as claimed in claim 23, wherein the power transformer comprising a primary winding, a secondary winding, and a tertiary winding, wherein the DC voltage source is applied to the primary winding and the control transistor, then the secondary and tertiary winding produces the output voltage and the second signal according to the switch on-off operation of the control transistor, respectively.

27. The power supply apparatus as claimed in claim 26, further comprising a protecting diode disposed between the tertiary winding of the power transformer and the switching device.

28. The power supply apparatus as claimed in claim 26, wherein the rectifier comprises a bridge rectifier and a capacitor.

29. The power supply apparatus as claimed in claim 26, wherein the switching device is a relay.

30. The power supply apparatus as claimed in claim 26, further comprising a starting circuit which is composed of resistors receiving the DC voltage source and capacitors charged by the DC voltage source.

* * * * *